(12) United States Patent
Edgley et al.

(10) Patent No.: US 7,712,530 B1
(45) Date of Patent: May 11, 2010

(54) PRE-STRESSED ANNULAR SEALANT AND METHOD OF CREATING A DURABLE SEAL IN A WELL BORE ANNULUS

(75) Inventors: Kevin Edgley, Duncan, OK (US); Larry Watters, Spring, TX (US); Fred Sabins, Montgomery, TX (US); Paul Sonnier, Kingwood, TX (US)

(73) Assignee: Superior Energy Services, L.L.C., New Orleans, LA (US)

( * ) Notice: Subject to any disclaimer, the term of this patent is extended or adjusted under 35 U.S.C. 154(b) by 13 days.

(21) Appl. No.: 11/836,306

(22) Filed: Aug. 9, 2007

(51) Int. Cl.
  *E21B 33/13* (2006.01)
  *C04B 9/12* (2006.01)
(52) U.S. Cl. ............... 166/293; 166/300; 106/800; 106/801
(58) Field of Classification Search ............... None
  See application file for complete search history.

(56) References Cited

U.S. PATENT DOCUMENTS

| | | | |
|---|---|---|---|
| 3,887,009 A | 6/1975 | Miller et al. | |
| 4,877,452 A | 10/1989 | Roussel et al. | |
| 5,016,711 A | 5/1991 | Cowan | |
| 5,121,795 A | 6/1992 | Ewert et al. | |
| 5,123,487 A | 6/1992 | Harris et al. | |
| 5,942,031 A * | 8/1999 | Cheung | 106/801 |
| 6,308,777 B2 | 10/2001 | Chatterji et al. | |
| 6,645,288 B1 | 11/2003 | Dargaud et al. | |
| 6,668,928 B2 | 12/2003 | Brothers | |
| 6,966,376 B2 | 11/2005 | Vaeth et al. | |
| 2005/0252419 A1* | 11/2005 | Mabey | 106/638 |
| 2006/0174805 A1* | 8/2006 | Chatterji et al. | 106/724 |

* cited by examiner

*Primary Examiner*—Zakiya W. Bates
(74) *Attorney, Agent, or Firm*—Garvey, Smith, Nehrbass & North, L.L.C.; Gregory C. Smith

(57) ABSTRACT

A pre-stressed annular sealant and method of creating a durable seal in a well bore annulus which is based on hydraulic cement that is designed to be easily pumped and placed into a casing-wellbore annulus, to set into a hardened mass, and to then undergo post-set crystal growth and phase changes in the crystalline matrix to combat inherent volumetric shrinkage and to create internally-generated compressive stress in the cement matrix. This internally-generated compressive pre-stressing compensates for tensile stress induced by well operations. The tensile stress must be greater in magnitude than the magnitude of the compressive pre-stress plus the magnitude of the cement's tensile strength before the cement sheath will fail in tension. This expansion and pre-stressing also creates significantly higher shear bond strengths than those developed with ordinary hydraulic cement.

11 Claims, 3 Drawing Sheets

PRE-STRESSED ANNULAR SEALANT AND METHOD OF CREATING A DURABLE SEAL IN A WELL BORE ANNULUS

CROSS-REFERENCE TO RELATED APPLICATIONS

Not applicable

REFERENCE TO A "MICROFICHE" APPENDIX

Not applicable

BACKGROUND OF THE PRESENT INVENTION

1. Field of the Invention

The method of the present invention relates to oil and gas production. More particularly, the present invention relates to a method of providing a durable sealant to prevent communication through the annular space formed between a drilled well bore and an inserted casing string in order to isolate the producing formation from all other formations exposed by drilling the hole.

Furthermore, the problem addressed by this invention is long-term sealing for zone isolation in petroleum wells. The need for a durable sealant to prevent communication through the annular space formed between a drilled well bore and an inserted casing string is driven by the need to isolate the producing formation that is targeted during the well drilling process from all other formations exposed by drilling the hole. In addition, the purpose is to isolate all formations that are drilled through from all other formations. An example is isolating potable water zones from brackish or salt water zones, and obviously from the producing formation. This isolation guarantees that hydrocarbons produced from the formation must flow into the casing and not around it. Additionally, zone isolation ensures that treatment fluids pumped into the formation to stimulate it will not flow into the annulus. This seal must withstand thermal and hydraulic stresses imposed on it throughout the well's life. The magnitudes of these stresses caused by well intervention, hydraulic fracturing, continued drilling below the casing, etc. can be significantly higher than one would imagine: on the order of several thousand psi. Additionally stresses can be either compressive or tensile.

2. General Background of the Present Invention

Hydraulic cement is routinely used as a sealant for oil and gas wells. While the composition seems to be ideal for the application since it is fluid for placement and then sets to a hard solid, set hydraulic cement has very low tensile strength. Most of the stresses generated on the annular sealant are tensile and of magnitude sufficient to create cement sheath failure.

The term "hydraulic cement" is meant to encompass any inorganic cement that hardens or sets underwater. Hydraulic cements, for example, include Portland cement, aluminous and pozzolan cement, and the like. The term "hydraulic cement" is also intended to include cements having minor amounts of extenders such as bentonite, gilsonite, and also is intended to include cements used either without any appreciable sand or aggregate material or such cements and admixed with a granular filling material such as sand, ground limestone, and the like. Thus, for example, any of the Class "A-H" and "J" cements as listed in the "ANSI/API Recommended Practice 10B-2 First Edition, July 2005" are suitable for this purpose.

This failure of cement seal in an annulus of a well previously sealed is documented routinely in the industry. Stress is induced by thermal cycling, pressure cycling, ceasing or re-initiating production, etc. Tensile hoop stresses imposed during these operations are easily sufficient in magnitude to cause seal failure.

Extensive prior art exists. Expansive reaction of MgO in cement is documented. Four patents are cited here as reference.

| PAT. NO. | TITLE |
|---|---|
| 4,797,159 | Expandable Cement Composition |
| 5,718,292 | Inflation Packer Method and Apparatus |
| 5,942,031 | Expanding Additive For Cement Composition |
| 7,036,586 | Methods of Cementing in Subterranean Formations Using Crack resistant Cement Compositions |

Expansion is noted, but pre-stressing effects are not realized since concentration is insufficient. It is believed that the concentration range claimed is the reason pre-stressing occurs and results in improved seal performance.

Many other references to MgO as a cement additive are specific for formulation of MgOCl cement. This material is acid-soluble but offers no benefit in the way of pre-stressing the cement matrix.

The following illustrations represent the stresses imposed on an element of cement in the cement sheath, and the effective stress state with Pre-Stressed Cement.

BRIEF DESCRIPTION OF THE SEVERAL VIEWS OF DRAWINGS

DETAILED DESCRIPTION OF THE PRESENT INVENTION

The invention disclosed is a cementing formulation based on hydraulic cement that is designed to be easily pumped and placed into a casing-wellbore annulus, to set into a hardened mass, and to then undergo post-set crystal growth and phase changes in the crystalline matrix to combat inherent volumetric shrinkage and to create internally-generated compressive stress in the cement matrix. This internally-generated compressive pre-stressing compensates for tensile stress induced by well operations. The cement tensile stress developed as a result of well operations must be greater in magnitude than the magnitude of the compressive pre-stress plus the magnitude of the cement's tensile strength before the cement sheath will fail in tension. This expansion and pre-stressing also creates significantly higher shear bond strengths than those developed with ordinary hydraulic cement.

Figure 1:
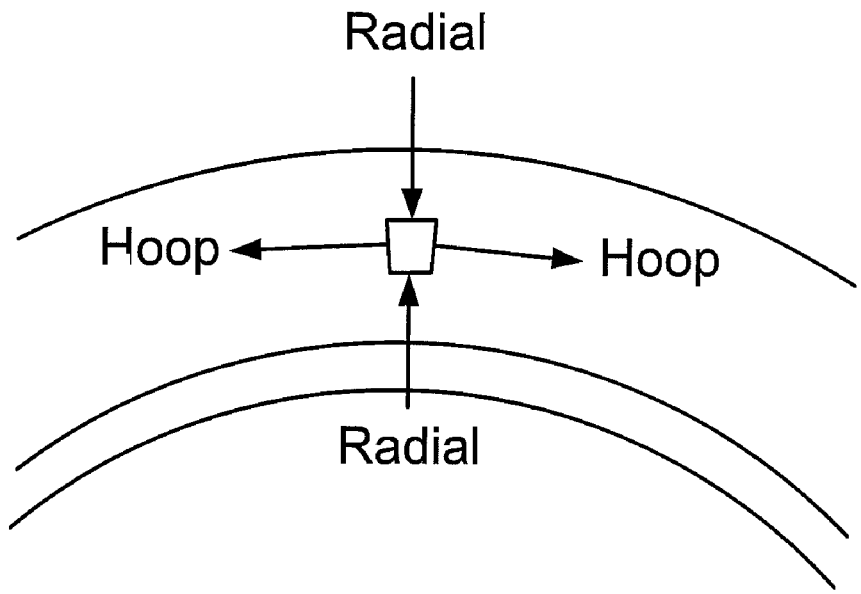
FIG. 1 illustrates the stress state in the cemented annulus in the method of the present invention.

FIG. 1 shows, in a horizontal plane cut through the wellbore, an infinitesimally small portion of cement and the stresses imposed upon it by internal pressure in the wellbore tubulars. When wellbore tubulars are pressurized, a triaxial stress state is produced in the cement matrix, consisting of a compressive radial component, a hoop (tangential) tensile component, and a shear axial component (not shown). When wellbore stresses become high enough to exceed either the compressive or tensile strength of the cement, flow paths can develop in the cement sheath, allowing fluids to migrate.

Figure 2:
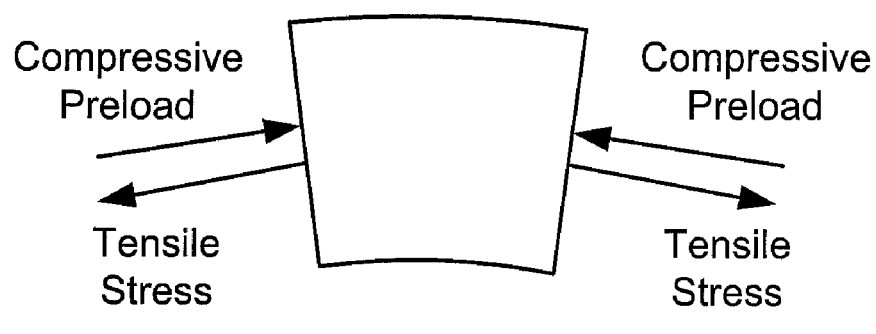
FIG. 2 illustrates the stress state on element of prestressed concrete in the method.

When pressure is applied to the wellbore tubulars, the tensile stress generated serves first to reduce the compressive prestress present in the cement before the material realizes a net tensile stress. Therefore, the effective tensile strength of the material is increased by the compressive preload applied as seen in FIG. 2.

Figure 3:
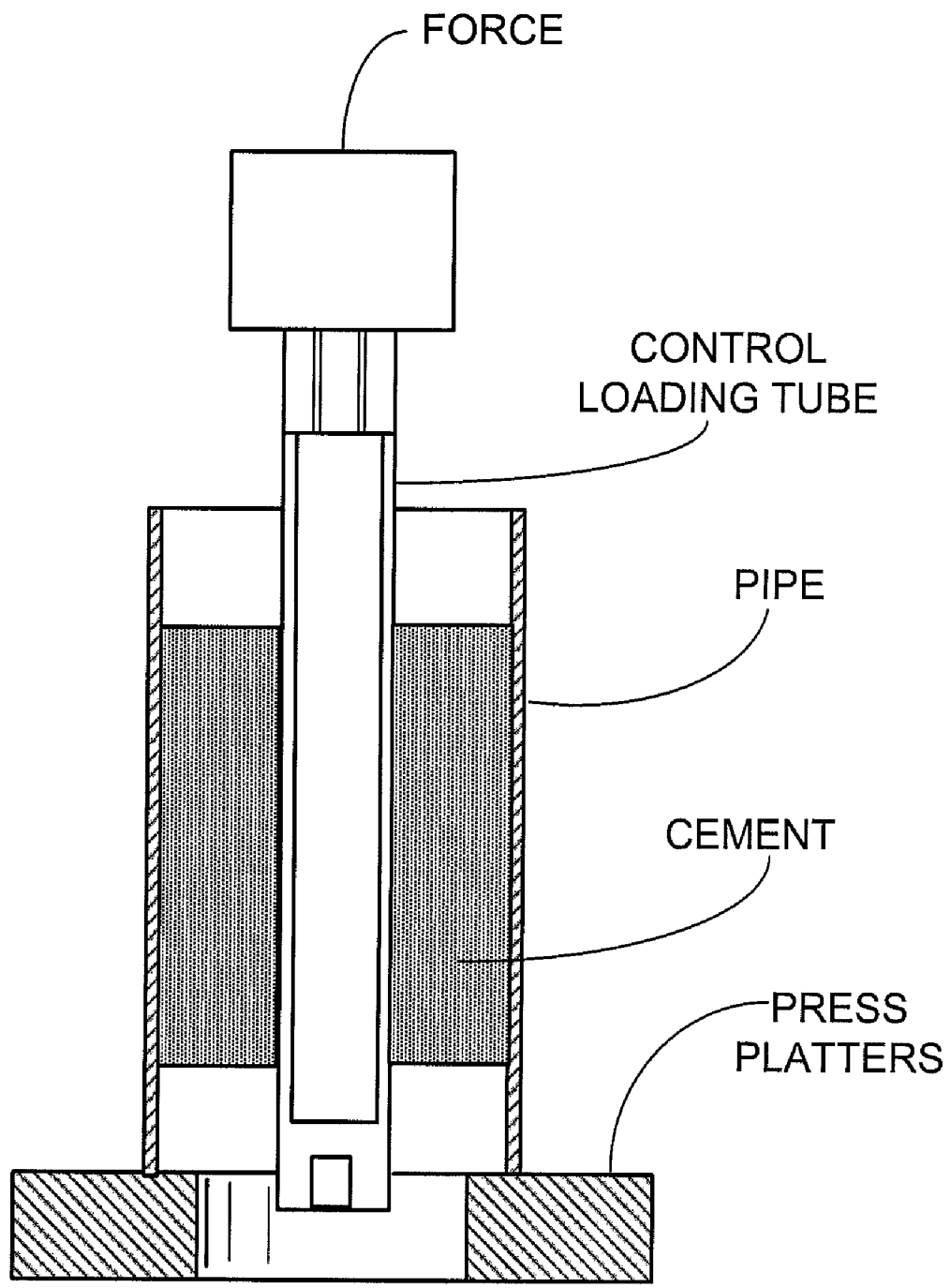
FIG. 3 illustrates a schematic of shear bond that is occurring in the method.

The shear bond measures the stress necessary to break the bond between the cement and the internal pipe. This was measured with the aid of a test jig that provides a platform for the base of the cement to rest against as force is applied to the internal pipe to press it through as seen in FIG. 3. The shear bond force is the force required to move the internal pipe. The pipe is pressed only to the point that the bond is broken; the pipe is not pushed out of the cement. The shear bond strength is the force required to break the bond (move the pipe) divided by the surface area between the internal pipe and the cement.

Figure 5:
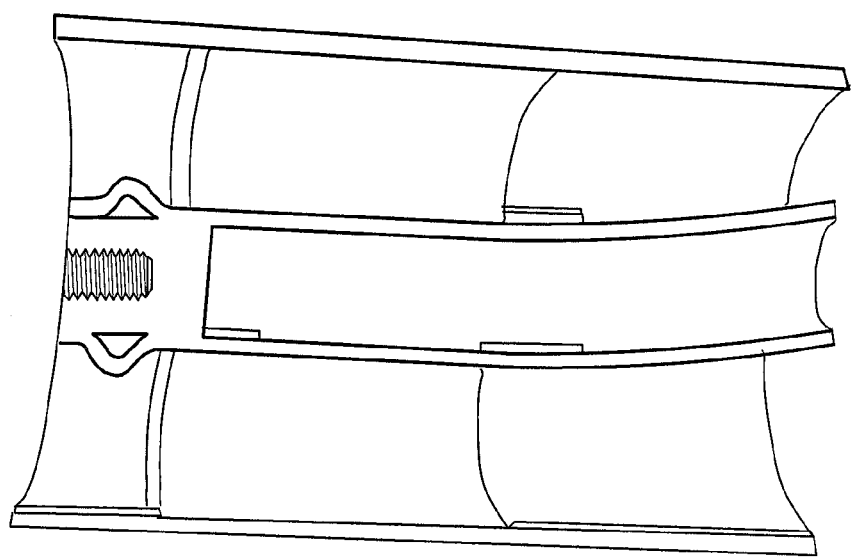
FIG. 5 illustrates a bent tube following shear bond testing.

In a test on the Pre-Stressed cement system utilizing the method shown in FIG. 3, the application of force on the central loading tube bent the pipe without breaking the bond. The sleeve/cement/loading pipe assembly was then reversed so force could be applied to the "short end" of the loading tube. This effort buckled the loading pipe around the welded-in pipe end in a mushroom fashion, again without failing the bond. FIG. 5 shows the resultant sectioned sample with the bent loading tube on the right and the mushroomed end on the left. 25,000 lbf was applied to the mushroomed end, supported by the 2¼" long cement plug. Without failing the bond, the cement supported 3,540 psi shear bond.

Figure 4:
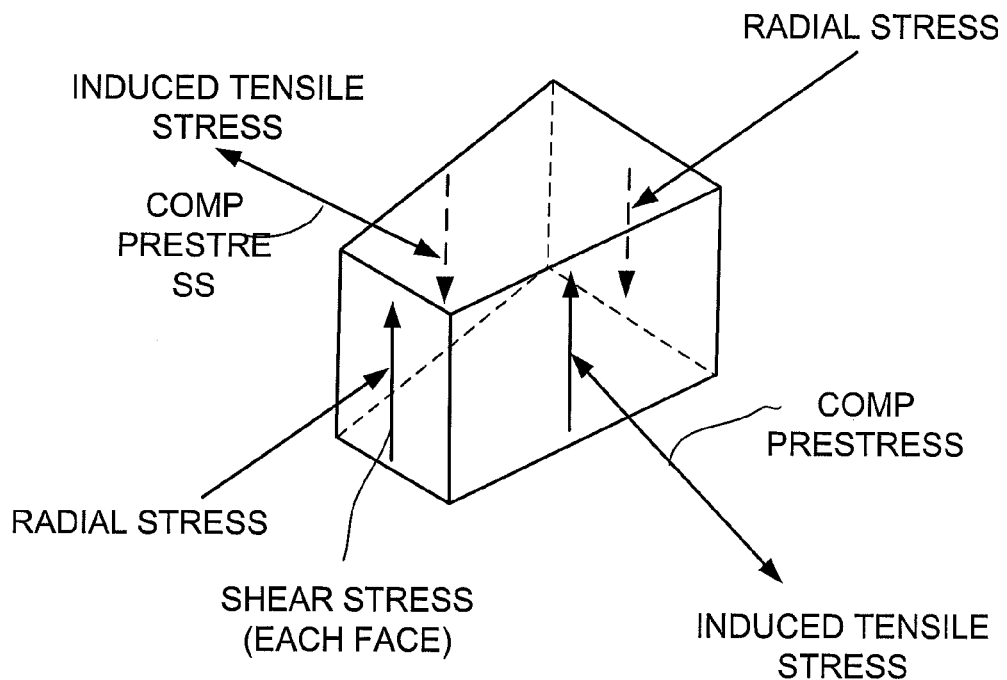
FIG. 4 illustrates the various stress components on an element of prestressed concrete in the method.

In FIG. 4 there is illustrated the various components of stress placed upon the component of pre-stressed cement in the method of the present invention. As seen in FIG. 4, for completeness, the stress state of an infinitesimally small section of cement in the wellbore subjected to loading as a result of internal pressure in the cemented pipe. The radial stresses are compressive and result from the tendency of the wellbore tubulars to swell from imposed internal pressure. The tensile ("hoop") stress results from the tendency of the wellbore cement sheath to grow diametrally as a result of the pressure loading inside the tubulars. The shear stresses are developed as axial forces are imposed, such as those due to the lengthening of the tubulars in response to the internal pressure. Pre-Stressed cement cures in such a way that the hoop stresses, before the application of loading, are compressive in direction. These compressive residual stresses must be relieved by the imposed loading before tensile hoop stresses can develop in the cement. The tri-axial post-set growth of the cement also means that the shear stresses developed from pressure loading must overcome not only the chemical cement-pipe bond, but the high mechanical friction between the cement and the pipe in order to breach the shear bond in the well.

As stated earlier, the basis for the formulation is hydraulic cement. The addition of deadburned magnesium oxide to the cement in concentrations of 20% to 40% by weight of cement provides the post-set crystalline growth necessary for pre-stressing. In addition to these two components, the formula contains microfine cement, crystalline silica to stabilize the hydraulic cement matrix at high temperature, fluid loss control additive, set retarder, and cement dispersant. The formulation is mixed with water to required density and is then ready for placement in a well.

Laboratory Development Data

Laboratory formulas and routine cement lab test results for various MgO-cement compositions appear in the following tables. Laboratory performance data for a selected composition is also presented.

System 1 is a formulation capable of being used in the field and demonstrates the low end loading of 20% deadburned magnesium oxide. Test results indicate acceptable Fluid Loss control, Thickening Time, Rheology and Free Fluid values for oilfield applications.

System 1: Class H Cement 94 lb/sk+25% bwoc Microcement slagbased+0.5% bwoc Fluid Loss additive+2.5% bwoc Dispersant+35% bwoc Silica Sand+20% bwoc MgO+0.10 gal/sk Retarder+5.00 gal/sk DI water mixed at 17.84 lb/gal, 1.61 ft³/sk.

Test Conditions: 230° F. BHCT, 290° F. BHST, 14500 ft MD and TVD, 68 minutes ramp time, 9825 psi BHP.

Test Results:

| System | Free Fluid (%) | Stirred Fluid Loss (ml/30 min) | Thickening Time 70 Bc (hrs:min) | Temperature (° F.) | Rheology | | | | | | | PV (cP) | YP (lb/100 ft²) |
|---|---|---|---|---|---|---|---|---|---|---|---|---|---|
| | | | | | 300 rpm | 200 rpm | 100 rpm | 60 rpm | 30 rpm | 6 rpm | 3 rpm | | |
| 1 | 0 | 70 | 3:17 | | 322 | 226 | 120 | 78 | 44 | 12 | 10 | 303 | 19 |
| | | | | 190 | 290 | 210 | 120 | 84 | 54 | 24 | 22 | 255 | 35 |

System 2 is a field ready design utilizing 30% deadburned magnesium oxide. Test results indicate acceptable Fluid Loss control, Thickening Time, Rheology and Free Fluid values for oilfield applications.

System 2: Class H Cement 94 lb/sk+25% bwoc Microcement slagbased+0.5% bwoc Fluid Loss additive+2.5% bwoc Dispersant+35% bwoc Silica Sand+30% bwoc MgO+0.14 gal/sk Retarder+5.00 gal/sk DI water mixed at 18.12 lb/gal, 1.66 ft³/sk.

Test Conditions: 230° F. BHCT, 300° F. BHST, 14500 ft MD and TVD, 68 minutes ramp time, 9825 psi BHP.

| | | | | Test Results: | | | | | | | | | |
|---|---|---|---|---|---|---|---|---|---|---|---|---|---|
| | Free Fluid | Stirred Fluid Loss | Thickening Time 70 Bc | Temperature | Rheology | | | | | | | | |
| System | (%) | (ml/30) | (hrs:min) | (° F.) | 300 rpm | 200 rpm | 100 rpm | 60 rpm | 30 rpm | 6 rpm | 3 rpm | PV (cP) | YP (lb/100 ft$^2$) |
| 2 | 0 | 34 | 3:37 | 80 | 366 | 254 | 130 | 78 | 38 | 6 | 4 | 354 | 12 |
| | | | | 190 | 122 | 88 | 42 | 22 | 10 | 2 | 1 | 120 | 2 |

System 3 is a field ready design utilizing 30% deadburned magnesium oxide. Test results indicate acceptable Fluid Loss control, Thickening Time, Rheology and Free Fluid values for oilfield applications. System 3 is tested at a higher temperature and deeper depth than System 1 and System 2

System 3: Class H Cement 94 lb/sk+25% bwoc Microcement slagbased+0.5% bwoc Fluid Loss additive+2.5% bwoc Dispersant+35% bwoc Silica Sand+30% bwoc MgO+0.3% Antisettling agent+2% bwoc Retarder+1% Retarder intensifier+0.05 gal/sk Retarder+7.41 gal/sk DI water mixed at 16.5 lb/gal, 2.00 ft$^3$/sk.

Test Conditions: 300° F. BHCT, 358° F. BHST, 18000 ft MD and TVD, 84 minutes ramp time, 13340 psi BHP.

| | | | | Test Results: | | | | | | | | | |
|---|---|---|---|---|---|---|---|---|---|---|---|---|---|
| | Free Fluid | Stirred Fluid Loss | Thickening Time 70 Bc | Temperature | Rheology | | | | | | | | YP |
| System | (%) | (ml/30 min) | (hrs:min) | (° F.) | 300 rpm | 200 rpm | 100 rpm | 60 rpm | 30 rpm | 6 rpm | 3 rpm | PV (cP) | (lb/100 ft$^2$) |
| 3 | 0 | 75 | 6:15 | 80 | 150 | 102 | 54 | 24 | 12 | 4 | 2 | 144 | 6 |
| | | | | 190 | 66 | 40 | 30 | 12 | 6 | 4 | 2 | 54 | 12 |

System 4 is a field ready design utilizing 30% deadburned magnesium oxide.

Test results indicate acceptable Fluid Loss control, Thickening Time, Rheology and Free Fluid values for oilfield applications. System 4 is tested at conditions between Systems 1 or 2 and System 3.

System 4: Class H Cement 94 lb/sk+25% bwoc Microcement slagbased+1.5% bwoc Fluid Loss additive+0.75% bwoc Dispersant+35% bwoc Silica Sand+30% bwoc MgO+0.4% Antisettling agent+0.24 gal/sk Retarder+0.12 gal/sk Retarder intensifier+0.02 gal/sk Defoamer+7.32 gal/sk DI water mixed at 16.5 lb/gal, 1.99 ft$^3$/sk.

Test Conditions: 271° F. BHCT, 328° F. BHST, 17800 ft MD and TVD, 81 minutes ramp time, 12960 psi BHP.

| | | | | Test Results: | | | | | | | | | |
|---|---|---|---|---|---|---|---|---|---|---|---|---|---|
| | Free Fluid | Stirred Fluid Loss | Thickening Time 70 Bc | Temperature | Rheology | | | | | | | | YP |
| System | (%) | (ml/30 min) | (hrs:min | (° F.) | 300 rpm | 200 rpm | 100 rpm | 60 rpm | 30 rpm | 6 rpm | 3 rpm | PV (cP) | (lb/100 ft$^2$) |
| 4 | 0 | 44 | 4:57 | 80 | 216 | 150 | 78 | 50 | 26 | 6 | 2 | 211 | 8 |
| | | | | 190 | 80 | 54 | 30 | 18 | 10 | 2 | 1 | 77 | 3 |

System 5 is a field ready design utilizing 30% deadburned magnesium oxide. Test results indicate acceptable Fluid Loss control, Thickening Time, Rheology and Free Fluid values for oilfield applications. System 5 is tested at lower temperatures and shallower depths than Systems 1, 2, 3 and 4.

System 5: Class H Cement 94 lb/sk+25% bwoc Microcement slagbased+0.3% bwoc Fluid Loss additive+2.5% bwoc Dispersant+35% bwoc Silica Sand+30% bwoc MgO+1% bwoc Retarder+1% Retarder intensifier+5.02 gal/sk DI water mixed at 18.1 lb/gal, 1.66 ft$^3$/sk.

Test Conditions: 214° F. BHCT, 251° F. BHST, 10836 ft MD and TVD, 26 minutes ramp time, 6130 psi BHP.

| | | | | Test Results: | | | | | | | | | |
|---|---|---|---|---|---|---|---|---|---|---|---|---|---|
| | Free Fluid | Stirred Fluid Loss | Thickening Time 70 Bc | Temperature | Rheology | | | | | | | | YP |
| System | (%) | (ml/30 min) | (hrs:min) | (° F.) | 300 rpm | 200 rpm | 100 rpm | 60 rpm | 30 rpm | 6 rpm | 3 rpm | PV (cP) | (lb$_f$/100 ft$^2$) |
| 5 | 0 | 51 | 2:16 | 80 | 440 | 308 | 166 | 106 | 53 | 16 | 8 | 427 | 20 |
| | | | | 190 | 248 | 170 | 88 | 52 | 26 | 6 | 4 | 247 | 4 |

Performance Data

TABLE 1

Shear Bond Testing Values

| System | Shear Bond (psi) |
|---|---|
| Class H + 35% bwoc Silica Flour + 5.16 gal/sk DI water mixed at 16.6 lb/gal, 1.37 ft$^3$/sk | 260 |
| System 1 | 1850+ |

TABLE 2

Results of Annular Seal Testing at 300 degrees F. and 1,500 psi

| | Baseline 99 | | | Pre-Stressed Cement | | |
|---|---|---|---|---|---|---|
| Pressure | Test 1 | Test 2 | Test 3 | Test 1 | Test 2 | Test 3 |
| 1,000 | 4,356 | 4,356 | 4,356 | 15,245 | 21,779 | 17,423 |
| 2,000 | 8,712 | 8,712 | 8,712 | 30,491 | 43,558 | 34,847 |
| 3,000 | 13,068 | 13,068 | 13,068 | 45,736 | 65,338 | 52,270 |
| 4,000 | 17,423 | 17,423 | 17,423 | 60,982 | 87,117 | 69,693 |
| 5,000 | 21,779 | 21,779 | 21,779 | 76,227 | 108,896 | 87,117 |
| 6,000 | 26,135 | 26,135 | 26,135 | 91,473 | 130,675 | 104,540 |
| 7,000 | 30,491 | 30,491 | 30,491 | 91,473 | 152,454 | 121,963 |
| 8,000 | 34,847 | 17,423 | 17,423 | 104,540 | 174,234 | 139,387 |
| 9,000 | 39,203 | 19,601 | 19,601 | 117,608 | 196,013 | 156,810 |
| 10,000 | 21,779 | 21,779 | 21,779 | 130,675 | 217,792 | 152,454 |
| Cum | 217,792 | 180,767 | 180,767 | 764,450 | 1,197,855 | 936,505 |
| Average | | 193,109 | | | 966,270 | |

Shear bond results with this material are extremely high, as noted in Table 1. In practice, the central pipe is pushed from the cement mass after the Annular Seal Tests are complete, and the force required to break the bond is translated into mechanical shear bond. FIG. 3 shows the test procedure schematically, and FIG. 5 shows the results of the test with Pre-Stressed Cement. Testing with Pre-Stressed Cement failed to break the bond, but bent the steel loading pipe. The load was then applied to the "short" end of the pipe, and the applied load mushroomed the steel about the welded pipe end.

The invention claimed is:

1. A pre-stressed annular sealant, comprising:
   a. a quantity of hydraulic cement;
   b. deadburned magnesium oxide added to the cement in concentrations of greater than 25% by weight of cement to provide a hydraulic cement matrix with post-set crystalline growth needed for pre-stressing;
   c. microfine cement, crystalline silica added to the formulation to stabilize the hydraulic cement matrix at high temperature;
   d. fluid loss control additive;
   e. a set retarder;
   f. a cement dispersant; and
   g. a quantity of water added to the formulation to required density for placement of the formulation in a well.

2. A method of creating a durable seal in a well bore annulus, comprising the following steps:
   a. providing a quantity of hydraulic cement;
   b. adding deadburned magnesium oxide to the cement in concentrations of no less than 25% by weight of cement to provide post-set crystalline growth needed for pre-stressing;
   c. adding microfine cement, crystalline silica to the cement formulation to stabilize the hydraulic cement matrix at high temperature; and
   d. adding quantity of water to the formulation to required density for placement of the formulation in a well.

3. A cementing formulation comprising hydraulic cement, microfine cement, crystalline silica and greater than equal to and no less than 25% MgO pumped and placed into a casing-wellbore annulus, to set into a hardened mass, to then undergo post-set crystal growth and phase changes in the crystalline matrix to combat inherent volumetric shrinkage and to create internally-generated compressive stress in the cement matrix.

4. The formulation in claim 3, wherein the internally-generated compressive pre-stressing compensates for tensile stress induced by well operations.

5. The formulation in claim 3, wherein the tensile stress must be greater in magnitude than the magnitude of the compressive pre-stress plus the magnitude of the cement's tensile strength before the cement sheath will fail in tension.

6. The formulation in claim 5, wherein the expansion and pre-stressing also creates significantly higher shear bond strengths than those developed with ordinary hydraulic cement.

7. A pre-stressed annular sealant, comprising:
   a. a quantity of hydraulic cement;
   b. deadburned magnesium oxide added to the cement in concentrations of greater than 25% by weight of cement to provide a hydraulic cement matrix with post-set crystalline growth needed for pre-stressing;
   c. microfine cement, crystalline silica added to the formulation to stabilize the hydraulic cement matrix at high temperature;
   d. fluid loss control additive;
   e. a set retarder; and
   f. a cement dispersant.

8. The annular sealant in claim 7, further comprising a quantity of water added to the formulation to required density for placement of the formulation in a well.

9. A method of creating a durable seal in a well bore annulus, comprising the following steps:
   a. providing a quantity of hydraulic cement;
   b. adding deadburned magnesium oxide to the cement in concentrations of no less than 25% by weight of cement to provide post-set crystalline growth needed for pre-stressing; and
   c. adding microfine cement, crystalline silica to the cement formulation to stabilize the hydraulic cement matrix at high temperature.

10. The method in claim 9, further comprising the step of adding quantity of water to the formulation to required density for placement of the formulation in a well.

11. The method in claim 9, wherein the concentration of deadburned magnesium oxide added to the cement would comprise no greater than 40% by weight of cement.

* * * * *